United States Patent
Lin et al.

(10) Patent No.: US 7,323,836 B2
(45) Date of Patent: *Jan. 29, 2008

(54) FAN MOTOR SPEED CONTROL CIRCUIT AND VOLTAGE-REGULATING MODULE THEREOF

(75) Inventors: Yu-Liang Lin, Taoyuan Hsien (TW); Yu-Lung Dung, Taoyuan Hsien (TW); Yueh-Lung Huang, Taoyuan Hsien (TW); Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/111,807

(22) Filed: Apr. 22, 2005

(65) Prior Publication Data

US 2006/0043950 A1    Mar. 2, 2006

(30) Foreign Application Priority Data

Aug. 27, 2004   (TW) .............................. 93125872 A

(51) Int. Cl.
*H02P 1/00* (2006.01)
(52) U.S. Cl. ...................................... 318/268; 318/439
(58) Field of Classification Search ................ 318/268, 318/471, 472, 473, 641, 599, 439, 809; 363/32–46, 363/98
See application file for complete search history.

(56) References Cited

U.S. PATENT DOCUMENTS

| 5,457,766 A | 10/1995 | Ko |
| RE35,124 E * | 12/1995 | Erdman et al. ............. 318/599 |
| 5,606,232 A * | 2/1997 | Harlan et al. ............... 318/138 |

FOREIGN PATENT DOCUMENTS

CN    2622928 Y    6/2004

\* cited by examiner

*Primary Examiner*—Rajnikant B. Patel
(74) *Attorney, Agent, or Firm*—Birch, Stewart, Kolasch & Birch, LLP

(57) ABSTRACT

A fan motor speed control circuit and a voltage-regulating module thereof are disclosed. The fan motor speed control circuit includes the voltage-regulating module and a driving module electrically connected to the voltage-regulating module. The driving module includes a pulse signal generating unit, a speed control unit, and a drive unit. The speed control unit compares a high frequency pulse signal generated by the pulse signal generating unit with a variable reference voltage signal output by the voltage-regulating module, and then outputs a control signal to the drive unit to proceed the speed control of the fan motor. In application, the voltage-regulating module and the driving module are electrically connected to a voltage source in parallel.

20 Claims, 5 Drawing Sheets

FAN MOTOR SPEED CONTROL CIRCUIT AND VOLTAGE-REGULATING MODULE THEREOF

FIELD OF THE INVENTION

The invention relates to a voltage-regulating module, and in particular, to a voltage-regulating module of a fan motor speed control circuit.

DESCRIPTION OF RELATED ART

In the conventional fan motor speed control technology, a voltage regulating circuit is commonly used to modulate an input voltage of a drive integrated circuit (drive IC) and to switch a transistor so as to control the speed of a fan motor.

FIG. 1 illustrates a conventional fan motor speed control circuit. There is a voltage regulating circuit (100) electrically connected to a power terminal (151) of a drive IC (15) and a voltage source (10), respectively. Output terminals (152a~152b) of the drive IC (15) are electrically connected to a coil of motor (17), and exciting terminals (153a~153b) of the drive IC (15) are electrically connected to a Hall element (16) that is used to inspect the magnetic pole of the fan motor to make electric current of the coil (17) match the position of the magnetic pole.

The voltage regulating circuit (100) includes a first resistor (11), a PNP transistor (12), a second resistor (13), and a Zerner diode (14). Based on the voltage value $V_{in}$ provided by the voltage source (10), the voltage regulating circuit (100) can modulate the input voltage $V_{cc}$ of the drive IC (15) to change the fan motor speed.

In the first situation, when the voltage value $V_{in}$ is less than the breakdown voltage $V_z$ of the Zerner diode (14), (for example, $V_{in}$ is 5.5 V as the minimum rated voltage of the drive IC, which is less than the breakdown voltage of 6.2 V), the transistor (12) will not be conducted and the fan motor speed is controlled and regulated by the first resistor (11).

In the second situation, when the voltage value $V_{in}$ is larger than the breakdown voltage $V_z$ of the Zerner diode (14), (for example, $V_{in}$ is 12 V as the maximum rated voltage of the drive IC), the transistor (12) is conducted to switch the fan motor to high speed.

Nevertheless, in the first situation, the resistor (11) will reduce the input voltage $V_{cc}$ of the power terminal (151) of the drive IC (15) such that the drive IC (15) cannot work resulting from that the driving voltage is less than the rated voltage of the drive IC (15). Besides, in the second situation of bearing large electric current and large power, the adopted transistor (12) must be expensive, thereby increasing the manufacturing cost.

SUMMARY OF THE INVENTION

In view of the disadvantages of the conventional voltage regulating circuit of the fan motor speed control circuit, the present invention provides a voltage-regulating module applied for the fan motor speed control circuit. The present invention need not an expensive transistor for bearing large electric current and large power, and thus the problem of the high cost in regulating voltage is solved.

According to the present invention, a fan motor speed control circuit includes a voltage-regulating module and a driving module electrically connected to the voltage-regulating module. The driving module further includes a pulse signal generating unit, a speed control unit, and a drive unit. The speed control unit compares a high-frequency pulse signal generated by the pulse signal generating unit with a variable reference voltage signal output by the voltage-regulating module, and then outputs a control signal to the drive unit to proceed the speed control of the fan motor. In application, the voltage-regulating module and the driving module are electrically connected to a voltage source in parallel.

In a preferred embodiment, the driving module is a drive IC, and the voltage-regulating module includes a plurality of resistors and a transistor, like a MOSFET or a bipolar junction transistor.

In the present invention, the input voltage of the driving module is equal to the voltage generated by the voltage source so as to prevent the driving module from irregularly working. In addition, the transistor used in the invention does not bear large electric current and not consume large power so as to save circuit design cost.

BRIEF DESCRIPTION OF THE DRAWINGS

An embodiment of the present invention can be more fully understood by reading the subsequent detailed description and examples with references made to the accompanying drawings, wherein.

DETAILED DESCRIPTION OF THE PREFFERED EMBODIMENT

Figure 1:
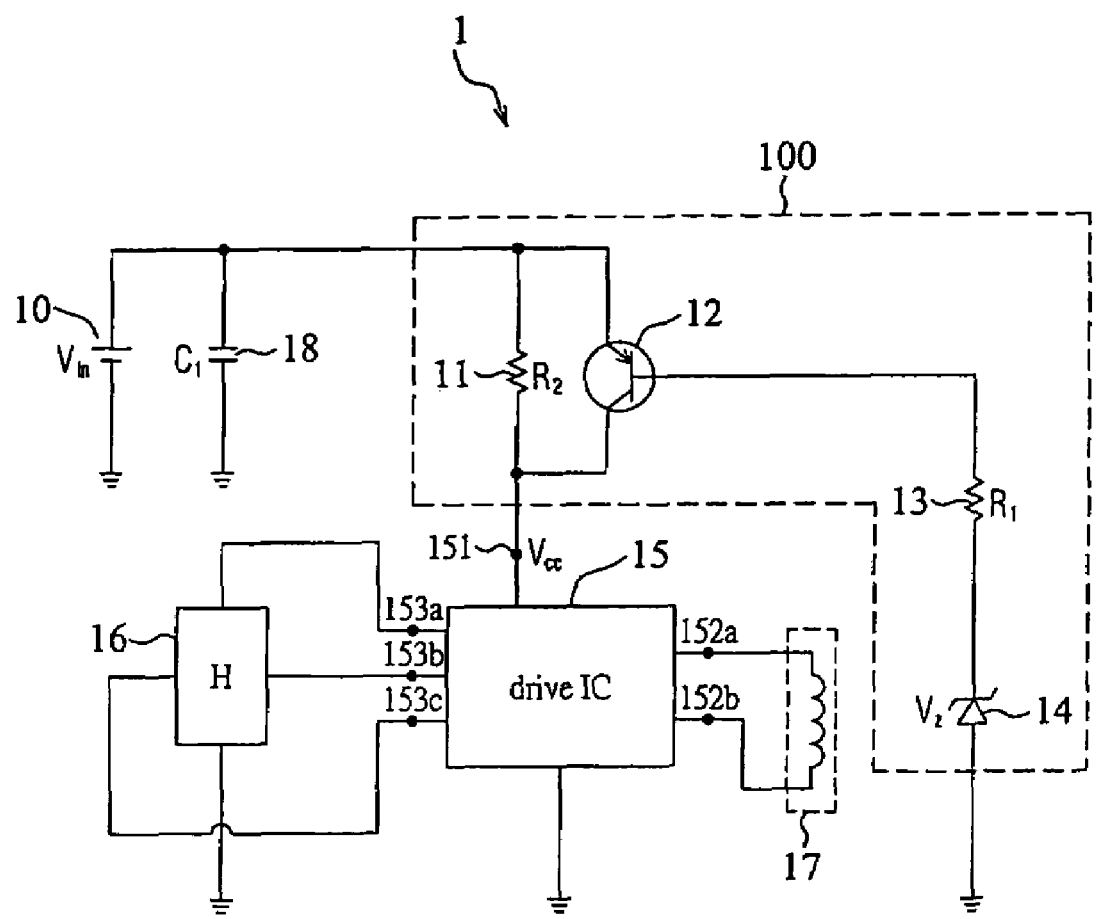
FIG. 1 is a conventional fan motor speed control circuit diagram.
Figure 2:
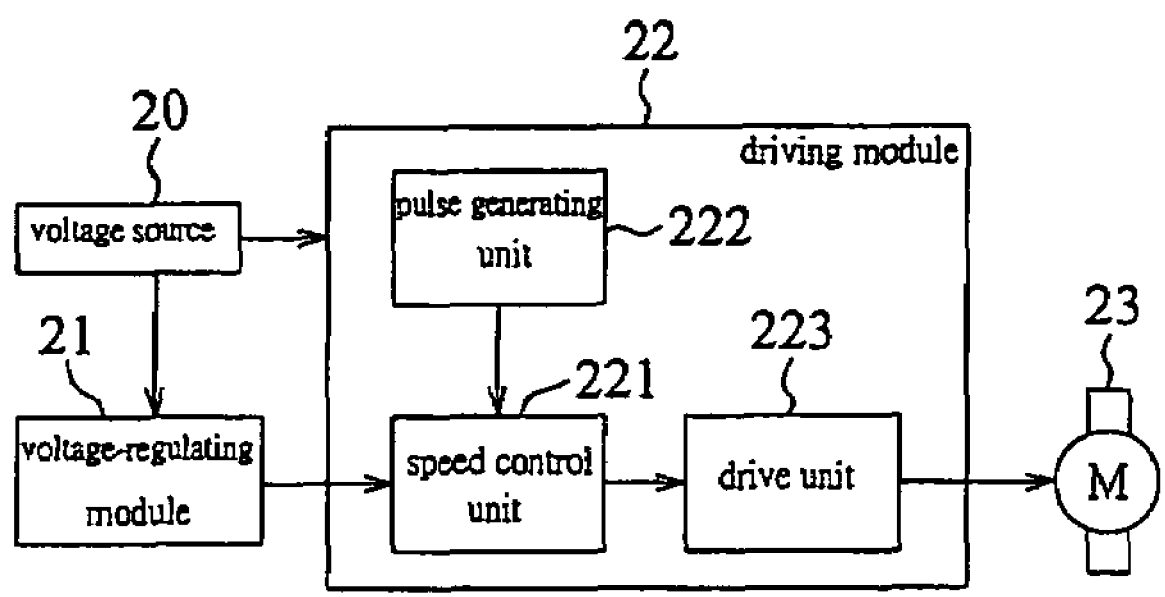
FIG. 2 is a block diagram of a fan motor speed control circuit of the present invention.

With reference to FIG. 2, a fan motor speed control circuit mainly includes a voltage-regulating module (21) and a driving module (22). The driving module (22) further includes a speed control unit (221), a pulse generating unit (222), and a drive unit (223). The driving module (22) is preferably a drive IC, which will be described hereinafter. Additionally, the voltage-regulating module (21) and the driving module (22) are electrically connected to a voltage source (20) in parallel. By comparing a triangular wave or a square wave having a certain frequency, generated by the pulse generating unit (222), with a reference voltage signal output by the voltage-regulating module (21), the speed control unit (221) outputs a corresponding control signal to the drive unit (223). Then, the drive unit (223) is able to drive a fan motor (23). The certain frequency described above can be a high frequency or low frequency, and the pulse generating unit (222) can be a pulse width modulation unit (PWM unit).

Figure 3:
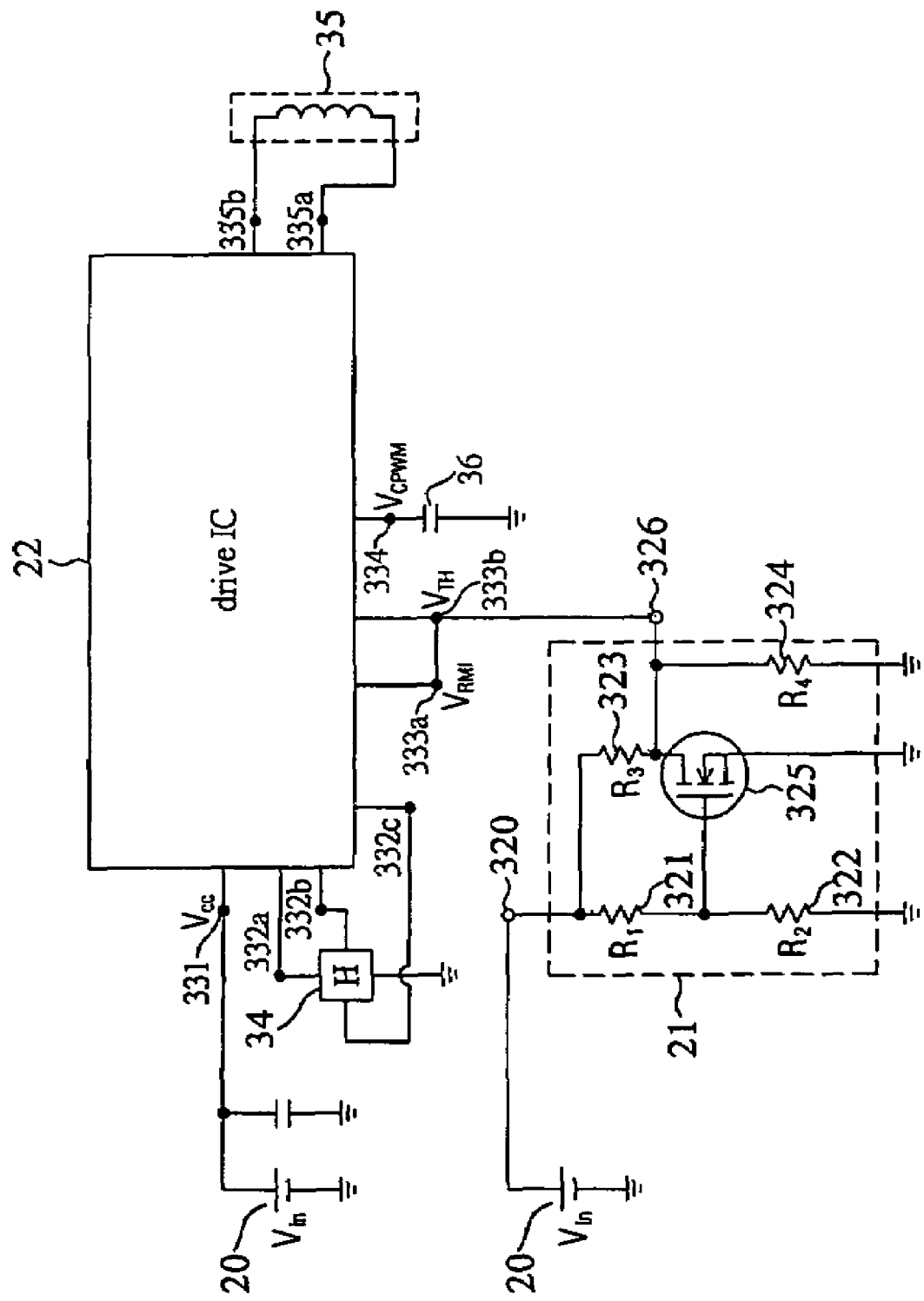
FIG. 3 is a detailed circuit diagram of a fan motor speed control circuit and a voltage-regulating module thereof in an embodiment of the present invention.

With reference to FIG. 3, a fan motor speed control circuit at least includes a voltage-regulating module (21) and a drive IC (22), wherein the speed control unit (221), pulse generating unit (222) and drive unit (223) as shown in FIG. 2 are integrated into the drive IC (22).

The drive IC (22) at least includes a power terminal (331), voltage level comparing terminals (333a~333b), pulse signal terminal (334), and output terminals (335a~335b). The drive IC (22) is electrically connected to a voltage source

(20) via the power terminal (331), and the voltage source provides a voltage $V_{in}$ for the drive IC (22). The speed control unit (221) is electrically connected to the voltage-regulating module (21) via the voltage level comparing terminals (333a~333b), the pulse generating unit (222) is electrically connected to a capacitor (36) via pulse signal terminal (334), and the drive unit (223) is electrically connected to a coil of the motor via output terminals (335a~335b). In addition, the drive IC (22) further has exciting terminals (332a~332c) which are electrically connected to a Hall element (34). The connective relationships among the Hall element (34), the coil (35), and the drive IC (22) are similar to the prior art, so the detailed description is omitted.

In this embodiment, the voltage-regulating module (21) includes several resistors (321~324) and a transistor, such as an enhancement-mode metal-oxide semiconductor field-effect transistor (MOSFET) (325). One end of the resistor (321) and one end of the resistor (323) are connected to the voltage source (31) in parallel. The other end of the resistor (321) is electrically connected to the gate electrode of the transistor (325), and the other end of the resistor (323) is electrically connected to the source/drain of the transistor (325). The other end of the drain/source of the transistor (325) is grounded. The voltage-regulating module (21) further has a voltage input terminal (320) and a voltage output terminal (326). The voltage input terminal (320) is electrically connected to a voltage source (20), and the voltage output terminal (326) is electrically connected to the voltage level comparing terminals (333a~333b).

Because the drive IC (22) and the voltage-regulating module (21) are electrically connected to the voltage source (20) in parallel, the input voltage value $V_{cc}$ is equal to the $V_{in}$ from the voltage source (20) so as to prevent the drive IC (22) from working in the unstable voltage condition or nonworking.

On the other hand, after obtaining the output voltage from the voltage-regulating module (21) via the voltage level comparing terminals (333a~333b), the speed control unit integrated into the drive IC (22) produces two reference voltages $V_{TH}$ and $V_{RMI}$, compares the voltage level $V_{CPWM}$ of a triangular wave signal generated by the pulse generating unit with the $V_{TH}$, and then outputs a corresponding control signal to the drive unit (223) of the drive IC (22) to drive the fan motor. It is noted that the present invention is able to adjust the values of the reference voltages $V_{TH}$ and $V_{RMI}$ by the resistors $R_1$, $R_2$, $R_3$, $R_4$ and MOSFET (325) to attain control objective. That is, each of the reference voltages $V_{TH}$ and $V_{RMI}$ is a variable voltage. In this embodiment, the $V_{TH}$ and $V_{RMI}$ have the same voltages.

Figure 4:
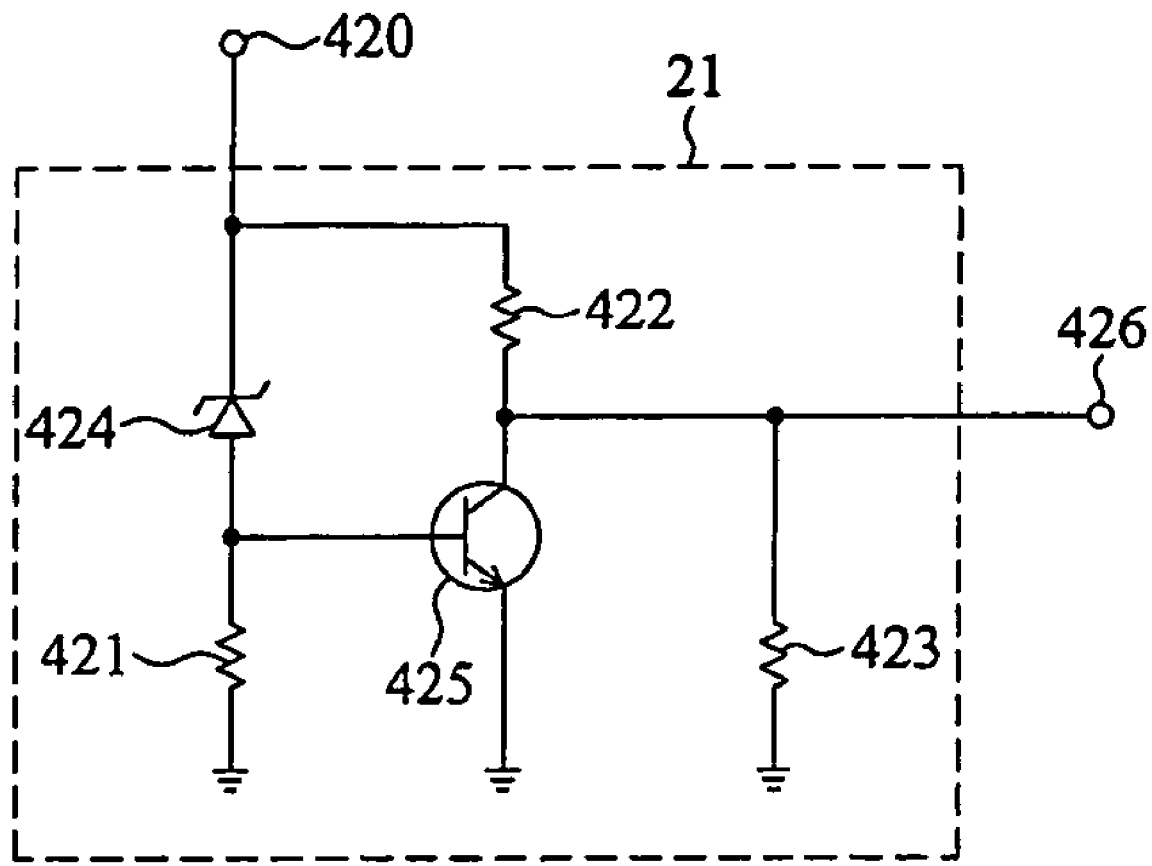
FIG. 4 is a circuit diagram of a voltage-regulating module in another embodiment of the present invention.

FIG. 4 illustrates another embodiment of voltage-regulating module (21) that includes several resistors (421~423), a Zerner diode (424), and a bipolar junction transistor. The voltage-regulating module (42) is also provided with a voltage input terminal (420) and a voltage output terminal (426). The voltage input terminal (420) is electrically connected to the voltage source (20) as shown in FIG. 3, and the voltage output terminal (426) is electrically connected to the voltage level comparing terminals (333a~333b) as shown in FIG. 3. Similarly, the voltage-regulating module (42) utilizes the resistors (421~423), the Zerner diode (424), and the bipolar junction transistor (425) to adjust the reference voltages $V_{TH}$ and $V_{RMI}$ to control the fan motor speed.

In application, since there is no another circuit element existing between the input voltage of the drive IC and the voltage source, no voltage-consuming problem happens so as to avoid abnormal working. Moreover, the transistors for bearing large electric current and large power are unnecessary in the present invention so that the manufacturing cost of the fan motor control circuit design can be greatly reduced.

Figure 5:
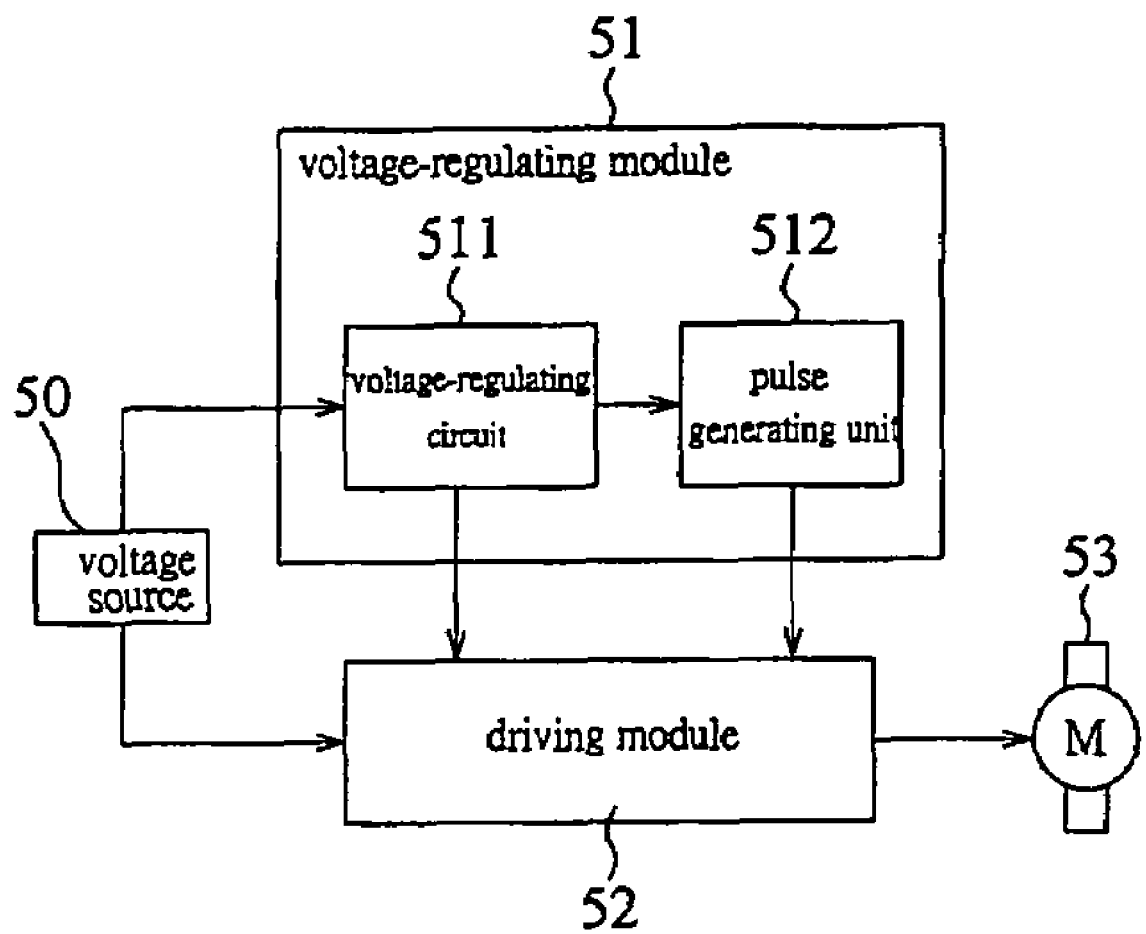
FIG. 5 is a block diagram of a fan motor speed control circuit in another embodiment of the present invention.

FIG. 5 is a block diagram of a fan motor speed control circuit according to another embodiment of the present invention. As shown in FIG. 5, a voltage-regulating circuit (511) and a pulse signal generating unit (512) are integrated to be a voltage-regulating module (51). The voltage-regulating module (51) and a driving module (52) are electrically connected to a voltage source (50) in parallel. The voltage-regulating circuit (511) receives the voltage or current form the voltage source (50) and outputs a self-regulating-bandwidth pulse signal; that is, according to the voltage or current, the voltage-regulating module (51) produces a reference voltage signal to regulate the bandwidth of the pulse signal generated by the pulse generating unit (512). The driving module (52) receives the pulse signal and accordingly adjusts the fans motor speed. Because all the elements and units of this embodiment and the electrical connective relationships thereof are similar to the aforesaid embodiment, the detailed description is omitted herein.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fan motor speed control circuit comprising:
    a voltage-regulating module electrically connected to a voltage source and receiving a voltage or current generated by the voltage source for outputting a reference voltage signal based on the voltage or current; and
    a driving module electrically connected to the voltage-regulating module for generating a pulse signal, and comparing the pulse signal with the reference voltage signal so as to output a control signal to drive a fan motor;
    wherein the voltage-regulating module and the driving module are electrically connected to the voltage source in parallel.

2. The fan motor speed control circuit as claimed in claim 1, wherein the driving module comprises:
    a pulse generating unit for generating the pulse signal;
    a speed control unit electrically connected to the voltage-regulating module and the pulse generating unit, receiving the reference voltage signal from the voltage-regulating module and the pulse signal, and outputting the control signal after comparing the reference voltage signal with the pulse signal; and
    a drive unit electrically connected to the speed control unit and receiving the control signal to drive the fan motor.

3. The fan motor speed control circuit as claimed in claim 1, wherein the pulse signal is a high-frequency pulse signal or a low-frequency pulse signal.

4. The fan motor speed control circuit as claimed in claim 1, wherein the reference voltage signal has a variable voltage level.

5. The fan motor speed control circuit as claimed in claim 1, wherein the driving module is a drive IC provided with a power terminal connected to the voltage source.

6. The fan motor speed control circuit as claimed in claim 1, wherein the voltage-regulating module comprises at least one resistor and at least one transistor.

7. The fan motor speed control circuit as claimed in claim 6, wherein the voltage-regulating module further comprises a Zerner diode.

8. The fan motor speed control circuit as claimed in claim 6, wherein the transistor is an enhancement-mode metal-oxide semiconductor field-effect transistor.

9. The fan motor speed control circuit as claimed in claim 1, wherein the pulse generating unit is a pulse width modulator.

10. The fan motor speed control circuit as claimed in claim 1, wherein the voltage-regulating module comprises:
- at least one transistor having a first electrode and a second electrode;
- at least one first resistor, one end of which is electrically connected to the first electrode; and
- at least one second resistor, one end of which is electrically connected to the second electrode;
- wherein the other end of the first resistor and the other end of the second resistor are electrically connected to the voltage source in parallel.

11. The fan motor speed control circuit as claimed in claim 10, wherein the first electrode is a gate electrode, and the second electrode is a source/drain electrode.

12. A fan motor speed control circuit comprising:
- a voltage-regulating module electrically connected to a voltage source to receive a voltage or current generated by the voltage source to produce a reference voltage signal, generating a pulse signal, and adjusting the bandwidth of the pulse signal based on the reference voltage signal; and
- a driving module electrically connected to the voltage-regulating module for receiving the pulse signal to adjust the speed of a fan motor;
- wherein the voltage-regulating module and the driving module are connected to the voltage source in parallel.

13. The fan motor speed control circuit as claimed in claim 12, wherein the voltage-regulating module comprises:
- a pulse generating unit for generating the pulse signal; and
- a voltage-regulating circuit electrically connected to the pulse generating unit and receiving the voltage or current generated by the voltage source to produce the reference voltage signal for comparing the pulse signal with the reference voltage signal to adjust the bandwidth of the pulse signal.

14. The fan motor speed control circuit as claimed in claim 12, wherein the pulse signal is a high-frequency pulse signal or a low-frequency pulse signal.

15. The fan motor speed control circuit as claimed in claim 12, wherein the reference voltage signal has a variable voltage level.

16. The fan motor speed control circuit as claimed in claim 12, wherein the driving module is a drive IC, and a power terminal of the driving module is electrically connected to the voltage source.

17. The fan motor speed control circuit as claimed in claim 12, wherein the voltage-regulating circuit comprises at least one resistor and at least one transistor.

18. The fan motor speed control circuit as claimed in claim 17, wherein the transistor is an enhancement-mode semiconductor field-effect transistor.

19. The fan motor speed control circuit as claimed in claim 17, wherein the voltage-regulating circuit further comprises a Zerner diode.

20. The fan motor speed control circuit as claimed in claim 13, wherein the voltage-regulating circuit comprises:
- at least one transistor having a first electrode and a second electrode;
- at least one first resistor, one end of which is electrically connected to the first electrode; and
- at least one second resistor, one end of which is electrically connected to the second electrode;
- wherein the other end of the first resistor and the other end of the second resistor are electrically connected to the voltage source in parallel.

* * * * *